(12) United States Patent
Pintz

(10) Patent No.: US 12,110,226 B2
(45) Date of Patent: Oct. 8, 2024

(54) EQUIPMENT AND METHOD FOR SELF-SERVICE MIXING AND DISPENSING CARBONATED FERMENTED DRINKS FROM CONCENTRATES

(71) Applicant: Gyorgy Pintz, Budapest (HU)

(72) Inventor: Gyorgy Pintz, Budapest (HU)

( * ) Notice: Subject to any disclaimer, the term of this patent is extended or adjusted under 35 U.S.C. 154(b) by 0 days.

(21) Appl. No.: 18/010,481

(22) PCT Filed: Dec. 3, 2020

(86) PCT No.: PCT/IB2020/061423
§ 371 (c)(1),
(2) Date: Dec. 15, 2022

(87) PCT Pub. No.: WO2022/038408
PCT Pub. Date: Feb. 24, 2022

(65) Prior Publication Data
US 2023/0227301 A1    Jul. 20, 2023

(30) Foreign Application Priority Data

Aug. 17, 2020 (HU) .................................. P2000274

(51) Int. Cl.
*B67D 1/00* (2006.01)
*A47J 31/40* (2006.01)
(Continued)

(52) U.S. Cl.
CPC .......... *B67D 1/0041* (2013.01); *B08B 9/0321* (2013.01); *B67C 3/001* (2013.01);
(Continued)

(58) Field of Classification Search
CPC .. B67D 1/0021; B67D 1/0057; B67D 1/0078; A47J 31/407
See application file for complete search history.

(56) References Cited

U.S. PATENT DOCUMENTS

| 4,911,212 A | * | 3/1990 | Burton | .................. | B01F 35/422 |
| | | | | | 141/90 |
| 9,797,652 B1 | * | 10/2017 | Wilkerson | ............ | F25D 31/002 |

(Continued)

FOREIGN PATENT DOCUMENTS

| CA | 2976616 A1 | 8/2016 |
| CN | 101073468 A | 11/2007 |

(Continued)

OTHER PUBLICATIONS

Simon István, Carbonated soft drinks, 1980, pp. 67-75,85-91, 95, Mezgazdasági Kiadó.

(Continued)

*Primary Examiner* — Dana Ross
*Assistant Examiner* — Lawrence H Samuels
(74) *Attorney, Agent, or Firm* — Bayramoglu Law Offices LLC

(57) ABSTRACT

An arrangement for brewing and dispensing fermented drinks, primarily beers, by portions using concentrates in a personalized, tailor-made manner that is fit for self-service. The arrangement is fitted with a primary alcohol unit and a secondary alcohol unit, which are suitable for adjusting the alcohol content for each portion and contain an alcohol and water mixture of a fermented liquid, and the controlling part is connected to at least one alcohol adjusting part that is suitable for setting the alcohol content of each portion of beverage. A fermented base concentrate and alcohol originating from the fermented beverage, left in and/or extracted from the base concentrate, is used as raw material, and the alcohol content of the beverage is adjusted by adding further alcohol, and the flavour of each portion of beverage is adjusted as desired.

6 Claims, 2 Drawing Sheets

(51) Int. Cl.
*B08B 9/032* (2006.01)
*B67C 3/00* (2006.01)
*B67C 3/20* (2006.01)
*B67C 3/26* (2006.01)
*B67C 7/00* (2006.01)
*B67D 1/07* (2006.01)
*B67D 1/08* (2006.01)
*C12C 12/00* (2006.01)

(52) U.S. Cl.
CPC .................. *B67C 3/20* (2013.01); *B67C 3/26* (2013.01); *B67C 7/00* (2013.01); *B67D 1/0029* (2013.01); *B67D 1/0058* (2013.01); *B67D 1/07* (2013.01); *B67D 1/0858* (2013.01); *C12C 12/00* (2013.01); *B08B 2209/032* (2013.01); *B67C 2003/2671* (2013.01)

(56) References Cited

U.S. PATENT DOCUMENTS

| | | | |
|---|---|---|---|
| 2003/0066306 A1* | 4/2003 | Renken | B67D 1/0857 62/390 |
| 2012/0035761 A1 | 2/2012 | Tilton et al. | |
| 2013/0276469 A1* | 10/2013 | Dryzun | B67D 1/0867 62/186 |
| 2014/0272019 A1 | 9/2014 | Schuh et al. | |
| 2015/0046877 A1 | 2/2015 | Cuppari et al. | |
| 2016/0222331 A1* | 8/2016 | Peirsman | B67D 1/0021 |
| 2016/0280527 A1* | 9/2016 | Griscik | B67D 1/0872 |
| 2016/0288064 A1 | 10/2016 | Tatera et al. | |
| 2017/0022463 A1 | 1/2017 | Kamil | |
| 2018/0049582 A1 | 2/2018 | Rehfuss | |
| 2018/0072972 A1* | 3/2018 | Shin | C12C 13/10 |
| 2018/0155176 A1 | 6/2018 | Cook | |
| 2018/0362318 A1* | 12/2018 | Rasmussen | B67D 1/0021 |
| 2019/0328170 A1* | 10/2019 | Cai | A47J 31/407 |
| 2020/0055717 A1* | 2/2020 | Peirsman | B67D 1/0884 |
| 2020/0216785 A1* | 7/2020 | Pintz | B67D 1/0021 |
| 2020/0216786 A1* | 7/2020 | Pintz | A47J 31/605 |

FOREIGN PATENT DOCUMENTS

| | | |
|---|---|---|
| CN | 206431746 U | 8/2017 |
| EP | 3000778 A1 | 3/2016 |
| EP | B225683 A1 | 10/2017 |
| MX | 2017003870 A | 6/2017 |
| WO | 2014086915 A1 | 6/2014 |
| WO | 2018044415 A1 | 3/2018 |
| WO | 2020047612 A1 | 3/2020 |
| WO | 2020141363 A1 | 7/2020 |

OTHER PUBLICATIONS

Adriana Donelian, et al., Performance of reverse osmosis and nanofiltration membranes in the fractionation and retention of patchouli essential oil, The Journal of Supercritical Fluids, 2016, pp. 639-648, vol. 107.

* cited by examiner

EQUIPMENT AND METHOD FOR SELF-SERVICE MIXING AND DISPENSING CARBONATED FERMENTED DRINKS FROM CONCENTRATES

CROSS REFERENCE TO THE RELATED APPLICATIONS

This application is the national phase entry of International Application No. PCT/IB2020/061423, filed on Dec. 3, 2020, which claims priority to Hungarian Application No. P2000274, filed on Aug. 17, 2020, the entire contents of which are incorporated herein by reference.

TECHNICAL FIELD

The subject of the invention is an equipment arrangement for dispensing in glasses or bottles, and sealing carbonated, fermented drinks, primarily beers, by portions using concentrates in a personalised, tailor-made manner that is fit for self-service. The invention also includes the application procedure.

BACKGROUND

The industrial procedure of producing beer is known; it includes the grinding of malt, mashing, boiling alone or often together with aromatizing hop, fermenting with added yeast, conditioning, and then bottling. These steps are commonly executed in breweries, and consumers are allowed to select a final product without being given any control over the alcohol content, hop content, or flavouring of the individual beverages. Cider brewing and brewing beers at home is a lengthy process that might take several weeks; a common feature of such processes is that they include a long fermentation process. A common feature of most beverage machines is that consumers are only allowed to select the type of their beverage without having any further control over density, flavour, etc.

Publication document No. MX2017003870 describes a known solution that is based on mixing various liquids, possibly enclosed in capsules, with carbonated water. The invention focuses on dispensing such beverages. A similar solution is described in documents Nos. EP 3000778 A1 and US 2018/0049582 A1. Document No. CA 2976616 also focuses on mixing and dispensing beverages. Document No. US 2018/0072972 A1 describes a portable beer brewing device. The primary goal of the device is to produce fermented products. A known solution is described in document No. WO 2014/086915 A1; it produces beverages from tea and coffee capsules, and its novelty consists of a liquid container and an injector device located on the wall of the device.

Patent description No. US 2014/0272019 describes a single-use product container and a device that produces a single portion of beverage from non-alcoholic artificial compounds, which have a wine, beer, or whisky flavour. It is believed that compounds present in traditionally boiled and/or fermented beverages are responsible for perishing, thereby limiting the storage period of traditional beverages. This means that concentrates are produced by artificial means instead of fermentation. They are made of compounds belonging to different flavour groups. Approximately 12 flavour groups can be mixed, so that they imitate the flavour of a wide range of wines, beers, and liqueurs. The compounds are kept in a single-use dish; the dish has two chambers, one for the compound, and one for the alcohol. The beverage is low on calories and is durable, but it is not adjusted by the consumer. The structure of the device is not described in detail. The device includes a pressurized gas tank and a cooling system. It also includes a mixing unit that mixes water and alcohol to the compounds. The device is similar to a hand-held blender. The blender is fitted to a mixing container, which is tightly connected to the mixing unit. The beverage can be poured from the container into a glass. The solution has numerous disadvantages. Beer drinkers are rather selective when it comes to flavours, and they prefer traditional flavours to artificial aromas. The real flavour of beer is produced through fermentation caused by bacteria. This solution does not include the use of yeast or fermentation, meaning that it does not include any industrial phase involving actual fermentation. It does not use basic concentrate and flavour concentrate. Furthermore, the components need to be shaken. When it comes to beer and other carbonated beverages, this may cause tension in the beverage, leading to intensive foaming. The carbonic acid content of beers is quite important, and it may be strongly reduced due to shaking. Another disadvantage is that the description does not include instructions on filling up beer bottles.

Patent description No. US 2017/0022463 describes a device and a procedure for producing beer capsules filled with synthetic or natural beer granulate. The capsule includes two parts separated by a membrane. One part of the capsule contains beer granulate, the other part contains alcohol. The beer granulate is dissolved in warm water, and alcohol is pushed out by $CO_2$ gas. No instruction is provided regarding the device, the absorption of gas, the expected foaming of the beer etc. The solution described in document No. US 2016/0280527 A1 uses fermentation, meaning that the procedure takes several days at least. The invention produces larger volumes, i.e. several identical portions simultaneously; the device is fairly large and expensive, and it is unsuitable for bottling.

Document No. WO2020141363 describes a household machine that produces single portions of beer using capsules. However, the device is unfit for retail utilization, and no control is provided over bitterness, alcohol content, density etc.

Document No. US2016/288064 describes a device and a procedure for dispensing carbonated beverages. The complex devices is fitted with cylinders and pistons, and it dispenses concentrates, such as beer. The primary goal of the device is to transport beer on a single path in an economic manner. Utility model description No. CN206431746 describes machine for producing tea and other beverages. Patent document No. CN101073468 describes a tap, built into a house with a multi-path valve, for mixing personalised beverage mixes. However, it specifically notes at FIG. 2 that it does not mix or produce beer, but simply lets it pass through. The solution includes cooling, a $CO_2$ unit, and a control unit.

Documents Nos. WO2018044415A1 and US2012035761A1 describe a beverage machine that does not include any container or bottle; customers fill their own containers, such as rustproof bottles, with hot or cold carbonated drinks. The machine is connected to a local water pipe, it is capable of dispensing personalised beverages, it is connected to a computer that stores the recipe of each client, and it is capable of disinfecting the container of each client. From among the documents, document No. WO2018044415A1 lists almost all kinds of beverages, including beers, among the available options, but it does not provide instructions regarding their implementation. Document No. US2015046877 provides instructions for portioning beverages using a mobile phone operator unit.

Document No. WO2020047612A1 describes a beverage mixing and dispensing machine for individually produced beverages that are ordered online. The solution mentions various, and typically non-alcoholic, types of beverages, but it does not mention any beer or cider. The base liquid is water or milk; the beverages are mostly carbonated and non-alcoholic beverages, even though alcohol or protein powder, sugar sirup, or electrolytes may be added to the mix. It may be fitted with a cooler or various replaceable flavour containers that are connected to a controller. Carbone-dioxide is added to the already mixed liquid in the mixer unit within the casing. Users are allowed to change the pre-programmed recipes. The key part of the solution is a mixing space; this is an indispensable component that is also mentioned in the title. A disadvantage of the solution is also related to the common mixer, as the mixing parts and inlets may be contaminated. Even though the description notes that water may also be used for flushing, the device could not be cleaned adequately using cold water after producing a milk-based beverage with protein powder and before producing a water-based fruity beverage. The residue left by milk-based beverages containing protein powder tends to go bad and emit an unpleasant smell over time, unless the machine is used frequently. This solution appears to be an unelaborated idea that seeks to cover too much ground without providing instructions on relevant details. It is also unsuitable for producing beers, as beers require special treatment; for example, stout and port beers contain less carbon dioxide than lager or ale beers.

Document No. US2016/280527 describes a capsule-based alcoholic beverage forming apparatus and components thereof. The aim is saving the costs of storage and shipping of alcoholic beverages. The apparatus can include multiple sources of alcohol and all of them with different temperature, but at the same beverage the alcohol is the same (one kind of alcohol) only the temperatures can be different. This apparatus prepares artificial drinks, which are total different category that a true beer or cider. There is no alcohol adjusting part for the final consumer after the selection of a kind of beverage.

Document No. EP3225683 A1 describes a kit for the in situ production of a fermented beverage. A concentrated beverage extracts is mixed with ethanol and water. The solution is different and does not make a tailor-made beer. Document No. US2018/362318 describes a beverage font for a beverage dispensing system. It uses a venturi tube for infusing the additives. Document US 2018/155176 describes an apparatus for dispensing beverages using alcoholic concentrates.

No known solution provides any instruction on how to produce individual and personalised beer or cider in retail trade or the hospitality industry according to the specific wishes of customers, so that consumers are allowed to set, for the final product, the desired alcohol level, the volume of dissolved solids (Balling or Piko degree for beers), the level of bitterness (IBU degree for beers), the colour (e.g. EBC code for beers), or the flavour. As for document No. CN101073468, the belief that beer may or should not be produced by mixing different components is professional prejudice. Neither solution could be used to serve personalised beer or cider beverages at mass events without queuing.

Neither known solution provides any instruction, going beyond mere ideas and the known mixing of syrups, that would be suitable for taking into account the special requirements of beers or the need for an economical approach.

The beer concentrate should not be regarded as a simple syrup; first, it is made of a living material, i.e. yeast, that could not be used to produce a base material as dense as a syrup; second, its aroma is not provided by dissolved solids only, as is the case for syrups, but it also includes various volatile materials that are produced during fermentation. Furthermore, thin alcohol (5 to 10%) is produced during fermentation, which is a valuable material in and of itself. This becomes a "superfluous" by-product during condensing, i.e. economic filtering. When working with large volumes, it is not economic to separate this thin alcohol into water and stronger alcohol. It is also uneconomic to purchase stronger alcohol separately (as taxes make such alcohols rather expensive), and then add that alcohol to the concentrate when producing beer as the final product.

The purpose of this invention is to eliminate the shortfalls of known solutions and to implement an invention that allows consumers to produce personalised, high quality, and yet economic beers in retail trade or hospitality events. Another purpose is to allow consumers to set the alcohol content of each portion of a fermented beverage, to choose its flavour, including its bitterness, to change its density (absolute dissolved solids content) etc. Another purpose is to allow consumers to consume the produced beverage immediately or to dispense it into a bottle with a unique label. Another purpose is to allow consumers opting for bottling to seal the bottle for long-term storage. Another purpose is to use at least some of the thin alcohol produced as a by-product of the beer concentrate.

The inventive step is based on the recognition that a solution, which is more advantageous than the previous ones, may be created by implementing the solution according to the instant invention.

SUMMARY

In an aspect is provided an equipment used for dispensing fermented drinks in glasses or dispensing and sealing carbonated, fermented drinks in bottles in a concentrate, personalised self-service portion comprising a carbon-dioxide bottle, a gas dispenser unit, a filling unit suitable for discharging the concentrate or liquid into a glass or bottle, at least one filling space for placing said glasses or bottles therein, a water pipe, a cooling unit, at least one beer concentrate container for storing concentrates of fermented drinks, at least one flavour concentrate container, at least one alcohol unit, a carbonator, and a controlling part that is fitted with a primary alcohol unit, which contains alcohol from the fermented drinks and a secondary alcohol unit, which adjusts the alcohol content for each portion through the controlling part; and the controlling part is connected to at least one alcohol adjusting part for each portion or to an operator terminal that is suitable for setting the alcohol content of each portion of fermented drink after selection of the fermented drink type.

In another aspect is provided a method of producing a portion of a fermented beverage according to consumer instructions, comprising using the equipment described above, wherein at least one base concentrate, at least one flavour concentrate, alcohol, and water are subject to cooling and carbonation, and the fermented beverage is poured into a glass or a closable bottle for consumption, wherein a fermented base concentrate and the alcohol originating from the fermented beverage is left in and/or extracted from the base concentrate, are used as raw materials, and alcohol is further added to the fermented beverage to adjust the alcohol content, and a flavour of each portion of the fermented beverage is adjusted as desired.

DETAILED DESCRIPTION OF THE EMBODIMENTS

Figure 1:
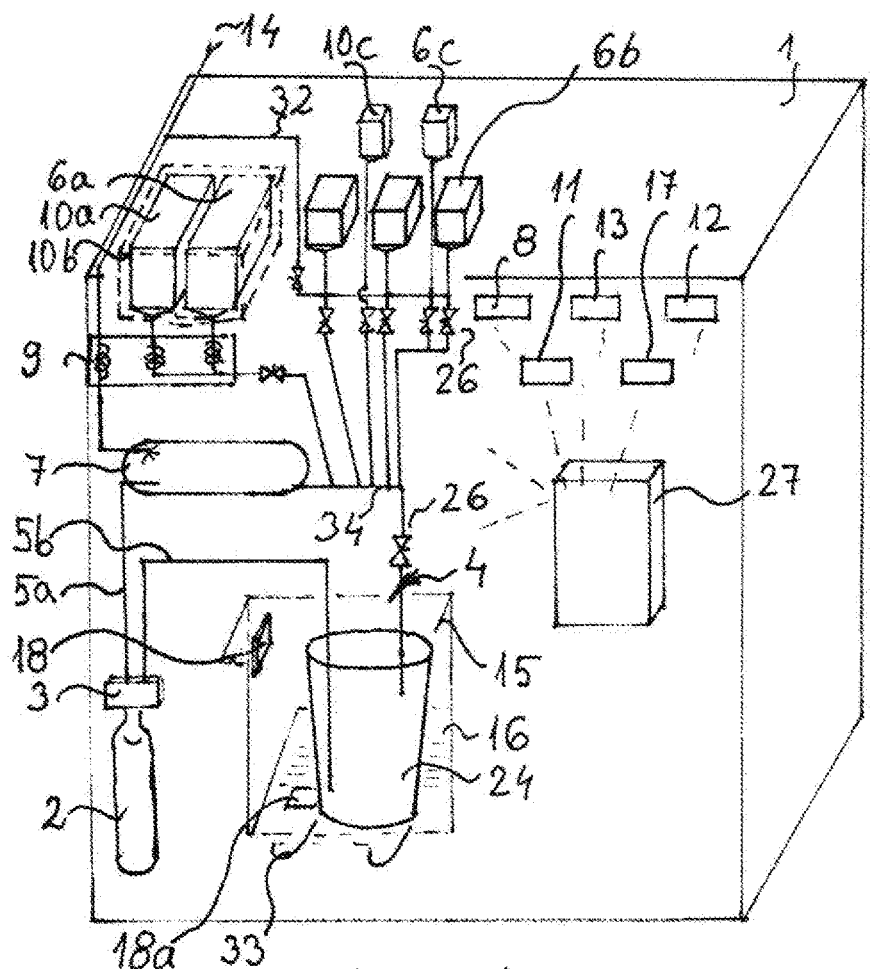
FIG. 1 shows a general and simplified layout of the arrangement.

The following definitions are provided for the purpose of interpreting the invention:

Portion means the volume that is commonly consumed by one or two persons of a beverage, which also fits into one or two bottles or glasses, typically between 100 ml and 1,200 ml. Personalisation means that the next portion could be a beer or another beverage of a totally different kind than the previous one, according to the wishes of consumers. Self-service means that the solution is fit for use in a self-serving manner, i.e. use by one or more consumers to produce and/or dispense one or more portions. Beverage means beer or cider; typically, an alcoholic beverage, but it may be a non-alcoholic beverage as well; in the latter scenario, the controlling part does not open the alcohol containers. References to beer in the description of the arrangement also include cider beverages as well.

Alcohol or secondary alcohol means ethyl alcohol (ethanol); it may be clear, thinned and/or flavoured, is more concentrated than the alcohol content foreseen for the final product, and is used to set the alcohol content of the final beverage.

Primary beer alcohol means primarily the alcohol or water and alcohol mixture that is the "by-product" of producing and filtering the beer concentrate, and it provides an economic starting substance for use by consumers. It may be substituted by other alcoholic by-products of the given operation as necessary. The secondary alcohol can be used to adjust the initial alcohol content that may be increased by consumers as they wish. A beer concentrate container and a primary alcohol unit can be combined into a beer primary alcohol unit.

Primary gas pipe means the gas pipe connecting the carbon-dioxide bottle to the carbonator, providing carbon-dioxide for primary saturation.

Secondary gas pipe means the gas pipe entering the filling unit and ending in the glass or bottle; it optionally delivers carbon-dioxide as necessary to set the final $CO_2$ content of the beverage; it may also deliver nitrogen ($N_2O$) for the adjustment of foaming.

Bitterness means one of the five basic tastes that plays a distinguished role in beers; it can be measured and set using a scale (EBU degree). Flavour means, in addition to basic tastes (e.g. sweet, bitter, sour, umami, salty), complex fruity flavours that are used in beers and ciders; they are less fit for being measured accurately, but may be set by adding, for example, juices, syrups, or even coffee, tea, or various aromas.

Carbonator (siphon) means a pressure-resistant container where a liquid is mixed with and saturated by $CO_2$ gas.

Water filter means a device located in or connected to the water tank; it ensures that the quality of the water makes it suitable for producing beer or another beverage. It is suitable for the water filter to be adapted to the quality of the water commonly filled into the water tank. It may be a water softener used alone or together with a microbiological filter; suitably, it may be a multi-phase water cleaning device using reversed osmosis.

Injector-like liquid merging or mixing means that the pressurised and saturated base liquid moving in the filling pipe causes a pressure drop in the connected pipe according to Bernoulli's principle, and this pressure drop helps the concentrates enter and mix in the filling pipe without using a separate mixer.

Excessive foaming means beer foam that flows over the final product container, such as a beer bottle, and causes contamination outside of the final product container.

Executing part means structural components that are known in and of themselves and execute the instructions given by the controlling part, such as magnetic valves, motoric valves, parts that perform safety and cleaning functions, parts that indicate levels or perform control functions, and pumps, such as peristaltic pumps that use volume displacement.

Filling unit means a component that discharges a concentrate, liquid, or $CO_2$ gas into a glass, bottle, or other dish.

Concentrate container means a container containing an individual component of a beverage; regardless to whether it is a concentrated or a non-concentrated beverage additive, what matters is that it will be thinned, alone or together with other components, before or during filling. It also includes the hop concentrate container, even if it may have different names in certain implementations. These may be installed in a common house or located separately.

Glass means any container that is open from an atmospheric perspective.

Operator terminal means a device, such as a computer, touchscreen, mobile phone, etc., that is suitable for enabling consumers to place orders and enter settings for their beverages; it issues instructions to the controlling part directly or indirectly.

Comfort unit means any unit that is not a mandatory component in and of itself, but without which the arrangement would feel a "low budget" or less safe solution without comfort. Such units may be integrated into or merely located next to the house. Such a units include, for example, label printing units, bottle disinfecting units, age verifying units, payment units, foam regulator units, bottle closing units, adjusting parts, possibly virtual ones, etc.

The most general implementation form of the invention is described in claim 1, and its application is described in the independent method/procedural claim. The various implementation forms and procedures for use are described in the dependent sub-claims.

As noted above, the subject of the invention is an arrangement for brewing, dispensing in glasses or bottles, and sealing carbonated, fermented drinks, primarily beers, by portions using concentrates in a personalised manner that is fit for self-service, and it includes a carbon-dioxide bottle, a gas dispenser unit, a filling unit, at least one filling chamber, a water pipe, a cooling unit, at least one beer concentrate container for storing concentrates of fermented liquids, at least one flavour concentrate container, a carbonator, a controlling part, and at least one comfort unit, and the executing parts are connected to the controlling part. A distinctive feature of the invention is that it is fitted with a primary (beer) alcohol unit, which contains alcohol from the fermented liquids and a secondary alcohol unit, which are suitable for adjusting the alcohol content for each type of beverage and/or each portion and contain an alcohol and water mixture of a fermented liquid, and the controlling part is connected to at least one alcohol adjusting part for each portion or to an operator terminal that is suitable for setting the alcohol content of each portion of beverage.

In an implementation form, the gas dispenser unit is connected to a primary gas pipe that is connected to a carbonator, and to a secondary gas pipe that is connected to a filling unit. The beer primary alcohol unit forms the beer concentrate container and the primary alcohol unit together.

A distinctive feature is that it includes a cleaning pipe, and the cleaning pipe is in a heat exchanging connection to the cooling unit condenser as appropriate. The carbonator is connected to the filling unit through the filling pipe, and the flavour concentrate containers open into the filling pipe in an injector-like manner. It may include a foam regulator unit as a comfort unit. As an additional comfort unit, it also includes a beverage selector part, a bitterness adjusting part, a flavour adjusting part, a beverage density adjusting part, or equivalent virtual control parts that are displayed on the operator terminal.

In another implementation form, the filling chamber is fitted with a filling door, and a holding unit is installed in the filling chamber so that it provides support for placing a bottle below the filling unit and holding it by the neck, and a bottle closing unit is located in front of the holding unit, and a holding hole that is suitable for stabilising the bottom of the bottle during closing is located below the bottle closing unit.

As an additional comfort unit, a lifting tray and/or a foaming unit is located in the filling chamber below the glass, and the arrangement may also include an age verifying unit.

In the course of the procedure according to the invention, a portion of a fermented beverage, primarily beer, is produced according to consumer instructions from at least one base concentrate, at least one flavour concentrate, alcohol, and water through cooling and carbonation, and the beverage is poured into a glass or a closable bottle for consumption. A distinctive feature of the procedure is that a fermented base concentrate and alcohol originating from the fermented beverage, left in and/or extracted from the base concentrate, is used as raw material, and the alcohol content of the beverage is adjusted by adding alcohol, and the flavour of each portion of beverage is adjusted as desired.

A distinctive feature of the procedure may be that primary carbon-dioxide saturation and secondary gas absorption is carried out, so that primary saturation is carried out in a carbonator, and secondary saturation, which is suitable for fine-tuning, is carried ort in the filling chamber. Secondary saturation is facilitated by a foam regulator unit and a foaming unit when filling a glass, or by a foam regulator unit when filling a bottle. The concentrates are added in an injector-like manner to the cooled and primarily saturated liquid flowing in the filling pipe. The filling pipe is cleaned by flushing through the pipes entering the filling pipe from the cleaning pipe.

The invention is presented in more detail using drawings of possible implementation forms.

FIG. 1 shows a simplified drawing, i.e. with incorrect dimensions, of the house 1, the carbon-dioxide bottle 2, the gas dispenser unit 3, the filling unit 4, the filling chamber 16, the water pipe 14, the beer concentrate container 6a, three flavour concentrate containers 6b, the hop flavour concentrate container 6c, the controlling part 27, the executing parts 26, the cooling unit 9, the primary alcohol unit 10a that contains the alcohol and water mixture of the fermented liquid, the secondary alcohol unit 10c, and the carbonator 7. The carbonator 7 is connected to the filling unit 4 by a filling pipe 34. The gas dispenser unit 3 is connected to the carbonator 7 by the primary gas pipe 5a, and to the filling unit 4 by the secondary gas pipe 5b. A broken line indicates the implementation form where the beer concentrate container 6a and the primary alcohol unit 10a is merged together so they form the beer primary alcohol unit 10b. The water pipe 14 and the pipe exiting the beer concentrate container 6a and the primary alcohol unit 10a, as well as the pipe exiting the beer primary alcohol unit 10b as the case may be, pass through the cooling unit 9. In this implementation form, the carbonator 7 is only used to saturate water, meaning that it is not contaminated. The carbonator 7 is pressure-resistant and it is designed to maximize the surface where water and gas meet. Carbon-dioxide gas is let in at the bottom, and cooled water is let in at the top in a pulverised form. The controlling part 27 is connected to the executing parts 26 and the operating parts (8, 11, 12, 13, 17) suitably by wires, but wireless radio or other known communication connection may also be used. Not all executing parts 26 are indicated. For example, the replaceability of certain subunits can and should be ensured through additional executing parts 26, suitably valves.

The desired beverage type is selected normally by using the beverage selector part 8. The number of available beer types usually, but not necessarily, corresponds to the number of beer concentrate containers 6a (e.g. lager, dark, wheat). If a single beer primary alcohol unit 10b is not assigned to the given type of beer, and if the given beer concentrate container 6a does not contain alcohol, a non-alcoholic kind of beer may also be selected using the alcohol adjusting part 13. Once the beverage selector part 8 is set, the alcohol content of the beer (or possibly cider) can be set using the alcohol adjusting part 13. The alcohol adjusting part 13 recommends the optimal alcohol content through a controlling part 27, which is similar to a dedicated computer, and it may be increased or reduced between certain limits. The latter value naturally depends on the alcohol content of the liquid stored in the beer primary alcohol unit 10b and the density of the selected beverage; the latter may be adjusted using the beverage density adjusting part 17 between certain limits. The individual settings and the volumes used have a natural impact on the price of the beverage, which is displayed on the controlling part 27. The bitterness (hop alpha acid content) of the beverage can be adjusted using the bitterness adjusting part 11. The flavour adjusting part 12 can be used to add different flavours to the beer, such as hop flavour, fruit flavours, etc.

The bottom of the filling chamber 16, indicated with a grid, makes it possible to drain excess or cleaning liquids. The filling door 15 and the foam regulator unit 18 is also indicated, but they are not necessarily used when filling up a glass 24. The foaming unit 18a reaching below the glass 24 is shown below; it may use, for example, ultrasound at 40 kHz frequency. It is only used exceptionally or if desired by a consumer; it stimulates foaming on top of the beverage and reinforces the foam structure. The arched lifting tray 33 supports the glass 24 when it is placed below the filling unit 4.

Figure 2:
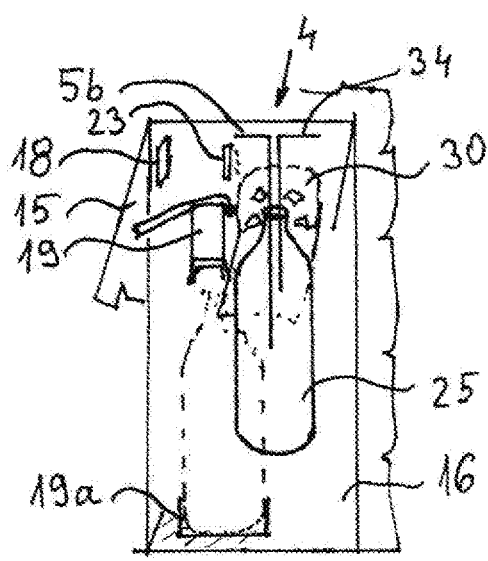
FIG. 2 shows a drawing of an implementation form where the filling space is suitable for filling a bottle.

FIG. 2 shows a drawing of another implementation form of the filling chamber 16 shown on FIG. 1. It shows the holding unit 30, which may be tilted when a bottle 25 is inserted, and it grabs and holds a segment of the neck of the bottle 25 when it is tilted back in position, so that the bottom of the bottle is not supported from below. In a tilted position, the pipes of the filling unit 4 may be inserted into the bottle 25. In this implementation form, the top part of the holding unit 30 and the filling chamber 16 is connected to each other and their pressure is balanced, so that the extra pressure created by the foam regulator unit 18 (1 to 2.5 bar) also appears in the holding unit 30. In another implementation form, it is also possible to create such extra pressure in the holding unit 30 only. The reason for this is the need to avoid excessive foaming when filling the bottle 25. Limited foaming may even be advantageous, as it pushes the air (oxygen), which is harmful in this context, out of the neck of the bottle 25. The foam regulator unit 18 is suitable for setting the optimal pressure level. In a possible implementation form, the foam regulator unit 18 may use 20 kHz ultrasound to prevent foaming beyond the mouth of the bottle 25. The figure also shows the filling pipe 34 and the secondary gas pipe 5b as part of and connected to the filling unit 4. The bottle closing unit 19 is located in the filling chamber 16 before the holding unit 30, and it is fitted with a cap dispenser or a magnetic one-off cap holder head. After filling, the bottle 25 is released from the holding unit 30 by tilting it forward manually or automatically, and then it is moved forward into the holding hole 19a. It stabilises the bottle 25 while the bottle 25 is closed manually or automatically by the bottle closing unit 19. The figure also shows the UV disinfecting unit 23, which uses ultraviolet C rays to disinfect the bottle before filling, or the filling chamber 16 during a break. The UV disinfecting unit 23 may not be active during filling, as UV light has a detrimental effect on beer.

Figure 3:
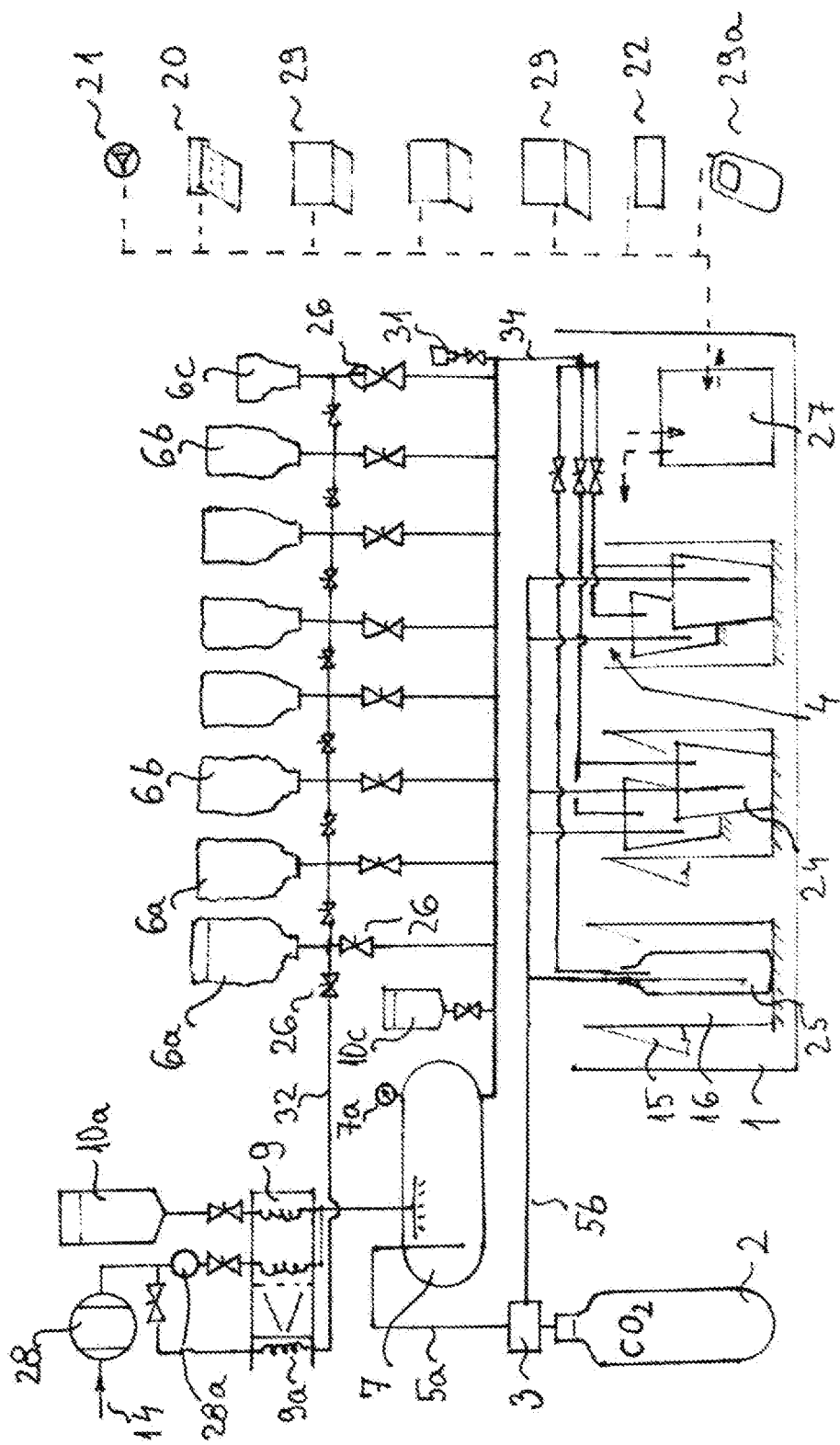
FIG. 3 shows drawings of the subunits of the arrangement.

FIG. 3 shows another implementation form, with distorted dimensions, broken down by subunits. The house 1 is indicated around several filling chambers 16, but most subunits and comfort units may also be located outside the house 1, as shown on the drawing. The comfort units include (as shown in part on FIG. 1 and FIG. 2) all non-mandatory control parts 8, 11, 12, 17 or their virtual equivalent on the fixed or mobile operator terminal 29, 29a, which can be used to order and to enter settings, as well as the water filter unit 28, the air removing unit 28a, the foam regulator unit 18, the foaming unit 18a, the bottle closing unit 19, the holding hole 19a, the label printing unit 20, the age verifying unit 21, the payment unit 22, the UV disinfecting unit 23, the lifting tray 33, the salting unit 31, the secondary gas pipe 5b, and the cleaning pipe 32.

A filling chamber 16 with two double filling units 4 is shown for the glasses 24, and a filling chamber 16 with a single filling door 15 is shown for bottles 25. A gas dispenser unit 3 is shown above the carbon-dioxide bottle 2, and it is connected to the filling unit 4 through the secondary gas pipe 5b, and to the carbonator 7 through the primary gas pipe 5a. The carbon-dioxide content of the beverage can be adjusted manually through the secondary gas pipe 5b, or advantageously automatically through the gas dispenser unit 3 and the controlling part 27. Manual adjustment is possible using a carbon-dioxide intensity adjusting part (not shown). The meter 7a is shown on the carbonator 7, and it sends measurement data to the controlling part 27. It may transmit data on volumes, temperatures, and pressures. The final carbon-dioxide content of a beverage can be calculated from such measurement data, and the foam regulator unit 18 can be adjusted accordingly. This way, the carbon-dioxide content of each personalised beverage can be optimised, including foaming, so that it reaches the minimum sufficient level when filling up a bottle 25. The carbonator 7 is connected to the filling units 4 by a filling pipe 34. There can be more than one filling pipes 34, but only one is shown. The carbonator 7 contains already saturated and cooled water and thin primary alcohol, and it also serves as a buffer when, for example, 15 to 20 portions are produced. The carbonator 7 may be cooled separately as well (not shown). The water pipe 14 and the pipe of the primary alcohol unit 10a go through the cooling unit 9 and/or its heat exchanger on the side of the vaporiser, and then they enter the carbonator 7. The network water arriving through the water pipe 14 enters the system and then goes through the water filter unit 28. The water filter unit 28 is suitably a water filter using reversed osmosis. Then, the water pipe 14 is drained by the cleaning pipe 32 that goes through the condenser 9a of the cooling unit 9. This way cleaning water is produced that is clean, warm, or at least not cold, and fully capable of dissolving various crusts and residues. Cleaning water may also be produced directly from the water pipe 14 operating at network pressure. Finally, cleaning water is released through the filling unit 4 into the canal directly or indirectly. An air removing unit 28a is indicated on the water pipe 14 following the water filter unit 28. It may be a container connected to a vacuum pump, and it is used to minimise the gas content of the water. The reason for this that the capability of water to absorb carbon-dioxide is also influenced by, in addition to temperature, its current gas content (air, oxygen). Reducing the latter improves the efficiency of carbon-dioxide saturation. The secondary alcohol unit 10c, the beer concentrate containers 6a, the flavour concentrate containers 6b, and the hop flavour concentrate containers 6c are connected through the executing parts 26 to the filling pipe 34, which channels the already saturated liquid. The concentrate containers 6a, 6b, 6c are indicated symbolically as compressible soft containers. As they become empty, these containers send a signal to the controlling part 27 through the executing parts 26. The executing parts 26 may be, for example, pumps or, when working with thick liquids, peristaltic pumps, but they are suitably simple magnetic valves combined with one-way valves. In the latter situation, the pipes are connected in a manner that allows for the effects of both gravity and injection. The salting unit 31 is the last part connected to the filling pipe 34.

FIG. 3 also shows the operator terminals 29, which can be used for beverage selection and possibly payment, and are technically the virtual counterparts of the control parts indicated on FIG. 1. It is advantageous to use more than one operator terminals 29, so that consumers can take their time to select a beverage without occupying the "hardware-based" filling units 4. The operator terminals 29 are in wired or wireless connection with the controlling part 27, and the flow information is indicated with a symbolic broken line. A smartphone-like operator terminal 29a is also shown, indicating that all these functions can be replaced by mobile app software. The age verifying unit 21, the payment unit 22, and the label printing unit 20 are also shown.

Numerous implementation methods are possible when using the arrangement according to the invention. Depending on the size of the arrangement (compact or large), it is also possible to optimise the production of beer concentrate and the raw material of alcohol. Water may be extracted from a stronger base beer by freezing; in such a scenario, some of the water, aromas, and alcohol remain in the beer concentrate. More water and alcohol mixture can be extracted through nano-filtering in one or two phases. Some of that mixture is used directly as primary alcohol, while the remaining mixture may be used to produce secondary alcohol through distillation.

In the most simple and general scenario, a consumer places a glass 24 into the filling chamber 16, and he selects the desired type of beverage using the beverage selector part 8. The flavour adjusting part 12 can be used to add additional flavours, such as raspberry concentrate or flavouring hop extract, as necessary, and the recommended alcohol content can be increased or reduced using the alcohol adjusting part 13. Further additives may be used to adjust the colour of beer. Then the price of the selected components is displayed to, and then approved by, the consumer. Then, the open filling of the glass 24 begins. Carbonated water, which is saturated and cooled in the carbonator 7, alcohol, and concentrates are filled into the glass 24 through the filling units 4 according to the selected and adjusted recipe. Additional carbon-dioxide may also be added to the glass 24. The volume of the latter may be regulated either according to the selected type or in a personalised manner through the gas dispenser unit 3. A separate mixing unit is unnecessary, as mixing is ensured by injection, joint filling, and possibly secondary saturation in the glass 24 or bottle 25.

Generally, standard values are recommended to consumers who use the invention, and they can deviate from such values. Such values can be entered by various means, for example, a specific degree of bitterness may be entered (e.g. IBU 22), or a text may be selected, such as "slightly bitter, very bitter". The operation of individual control parts is described at FIG. 1. Cleaning is described at FIG. 3. The entire arrangement is designed to avoid the build-up of crust.

Another clear example is provided through the examination of FIG. 2 showing one of the numerous implementation forms. Here, the bottle 25 is placed into the filling chamber 16. It may be moved automatically or manually from the outside. The filling door 15 is closed. The bottle 25 is exposed to UV-C rays using the UV disinfecting unit 23 for a period needed, e.g. for 20 to 30 seconds. The bottle 25 may also be held at its head using a holding unit 30. In such a scenario, the bottle 25 is lifted into the holding unit 30 manually, so that the filling units 4 enter it, and the holding unit 30 holds onto the neck of the tilted bottle 25 and keeps it in the air. After filling, the hold is released, and the bottle 25 is moved forward, automatically or manually, for closing. Suitably, a crowned cap is used for closing.

In an implementation form, consumers are identified to determine if they reach the age limit for alcohol consumption in the given jurisdiction. The strength and final Balling degree of the selected beverage type can be adjusted using the beverage density adjusting part 17. Consumers can pay using the payment unit 22 or online; it is also possible that only a basic label is provided with basic data, a bar code, and the price, and payment is made at a cash register using that label. Water is filtered in a water filter unit 28 using reversed osmosis. The label printing unit 20 is suitable for printing bar code stickers for scanning at a cash register. Furthermore, it also makes it possible to print unique labels. In such a scenario, the consumer selects a recommended label type, and provides a personal message, e.g. "Pilsen beer for dad". The message or a photograph can be entered using the operator terminal 29, 29a or another data input unit that is not shown here. The label can be affixed to the bottle 25.

The arrangement according to the invention has numerous advantages. Consumers can produce personalised, tailor-made beers in retail trade or hospitality events. Consumers can set the alcohol content of each portion of a fermented beverage, choose its flavour, including its bitterness, change its density (absolute dissolved solids content), carbon-dioxide content, bitterness etc. The carbon-dioxide content, as well as the foam layer or excessive foaming, for glasses or bottles respectively, can be optimised. The beverage can be bottled or consumed immediately. A significant economic advantage is that the alcohol produced as a by-product during the production of beer concentrate is also utilised.

An implementation form and application procedure, covered by the scope of protection, has already been described in short and without drawings, so that its implementation is clear for a professional. In this context, another advantage is that the arrangement may be multiplied or extended with certain units also described here. For example, more than one filling chambers may be deployed, as shown on FIG. 3, and multiple equivalent glasses and bottles may be placed into a single filling chamber. It is also possible that a consumer orders the same beverage for his partner or friends, so he does not need to wait for filling, as filling may be performed simultaneously, possibly with certain data corrections; for example, 300 ml beverage is poured into one glass, and 500 ml with a different flavour is poured into another. As selecting and composing a beverage may require for some time to be spent thinking, it would be unfortunate if a single hesitant consumer would occupy an entire device. For this reason, the control parts may be installed in more than one instances, or they may be "outsourced" as shown on FIG. 3. The house itself may also be broken down into several units in the same manner, so that the central units, containers, consumer-operated control parts, and comfort units are placed into a separate house segment, and the filling units and possibly the carbon-dioxide bottle may be installed separately. Breaking it down into subunits has the unexpected advantage that queuing before the arrangement according to the

What is claimed is:

1. An equipment used for dispensing carbonated and fermented drinks in glasses or dispensing and sealing the carbonated and fermented drinks in bottles by portions in a personalised manner for a self-service, comprising a carbon-dioxide bottle, a gas dispenser unit, a filling unit configured to discharge the carbonated and fermented drinks into the glasses or the bottles, at least one filling space for placing the glasses or the bottles, a water pipe, a cooling unit, a beer concentrate container including a fermented beer concentrate, a primary alcohol unit containing a water and alcohol mixture, at least one flavour concentrate container, a carbonator, a controlling part, a secondary alcohol unit, and a cleaning pipe, wherein the water and alcohol mixture is filtered from the fermented beer concentrate by nano-filtration to concentrate an alcohol level of the fermented beer concentrate, the primary alcohol unit is configured to add at least a part of the water and alcohol mixture to at least a part of the fermented beer concentrate and thereby dilute the alcohol level of the part of the fermented beer concentrate, the secondary alcohol unit is configured to add additional alcohol to the fermented beer concentrate and to adjust alcohol content for each of the portions through the controlling part; wherein the controlling part is connected to at least one alcohol adjusting part for each of the portions or to an operator terminal configured to set the alcohol content of each of the portions of the carbonated and fermented drinks after selecting a fermented drink type; and wherein the cleaning pipe is in a heat exchanging connection with a condenser of the cooling unit, and the cooling unit is upstream of the secondary alcohol unit, the hop flavour container and the at least one flavour concentrate container.

2. The equipment according to claim 1, wherein the gas dispenser unit is connected to a primary gas pipe, the primary gas pipe is connected to the carbonator and further connected to a secondary gas pipe, and the secondary gas pipe is connected to the filling unit.

3. The equipment according to claim 2, wherein the beer concentrate container and the primary alcohol unit together form a beer alcohol unit.

4. The equipment according to claim 1, wherein the beer concentrate container and the primary alcohol unit together form a beer primary alcohol unit.

5. The equipment according to claim 1, wherein the controlling part comprises a bitterness adjusting part, a flavour adjusting part, and a beverage density adjusting part.

6. The equipment according to claim 1 wherein the at least one filling space is fitted with a filling door, and a holding unit is installed in the at least one filling space, wherein a bottle is placed below the filling unit and the holding unit provides a support for the bottle by holding a neck of the bottle, and wherein a bottle closing unit is located in front of the holding unit and comprises a holding hole, the holding hole is configured to stabilize a bottom of the bottle during a closing and is located below the bottle closing unit.

\* \* \* \* \*